United States Patent [19]

Hutchings

[11] Patent Number: 5,359,341
[45] Date of Patent: Oct. 25, 1994

[54] POWER SUPPLY FOR SEQUENTIALLY ENERGIZING SEGMENTS OF AN ELECTROLUMINESCENT PANEL TO PRODUCE ANIMATED DISPLAYS

[75] Inventor: Philip D. Hutchings, Wilshire, England

[73] Assignee: Tek Electronics Manufacturing Corporation, Manchester, Conn.

[21] Appl. No.: 872,165

[22] Filed: Apr. 22, 1992

[51] Int. Cl.⁵ .................. G09G 3/30; H05B 33/08
[52] U.S. Cl. .................................. 345/45; 345/122; 345/903; 315/169.3
[58] Field of Search ............... 340/760, 781, 815.11, 340/752, 756, 753, 811, 725; 315/169.3, 276; 345/33, 36, 45, 51, 52, 56, 121, 122, 212, 213, 903, 211

[56] References Cited

U.S. PATENT DOCUMENTS

| | | | |
|---|---|---|---|
| 3,549,783 | 12/1970 | Bendrick | 345/903 |
| 3,573,532 | 4/1971 | Boucher | 345/45 |
| 3,662,374 | 5/1972 | Harrison, III et al. | 340/725 |
| 4,109,245 | 8/1978 | Hedin | 340/760 |
| 4,122,444 | 10/1978 | Kitajima | 345/33 |
| 4,187,505 | 2/1980 | Morley et al. | 340/753 |
| 4,213,125 | 7/1980 | Watanabe | 340/753 |
| 4,216,471 | 8/1980 | Akred, Sr. | 340/756 |
| 4,595,861 | 7/1986 | Simopoulos et al. | 315/169.3 |
| 4,611,150 | 9/1986 | Ball et al. | 315/169.3 |
| 4,642,710 | 2/1987 | Murtha et al. | 340/725 |
| 5,191,319 | 3/1993 | Kiltz | 340/815.11 |

FOREIGN PATENT DOCUMENTS 1191192  7/1985  Canada ........................ 315/169.3

Primary Examiner—Ulysses Weldon
Assistant Examiner—Kara A. Farnandez
Attorney, Agent, or Firm—McCormick, Paulding & Huber

[57] ABSTRACT

A power supply for sequentially energizing segments of an EL display device to produce an animated graphic using an EPROM to store the excitation information for the respective segments to be illuminated. The EPROM may be replaced by another EPROM programmed with a different sequence for the same or a different EL graphic display device. An alternating voltage wave generator has an adjustable frequency and variable pulse width output to match the characteristics of the EL device being driven to obtain the best illumination and device life for the given EL device. An optional microphone senses background music or other audio signals to synchronize the movement of the animated graphic to the beat or rhythm of the sensed audio.

10 Claims, 4 Drawing Sheets

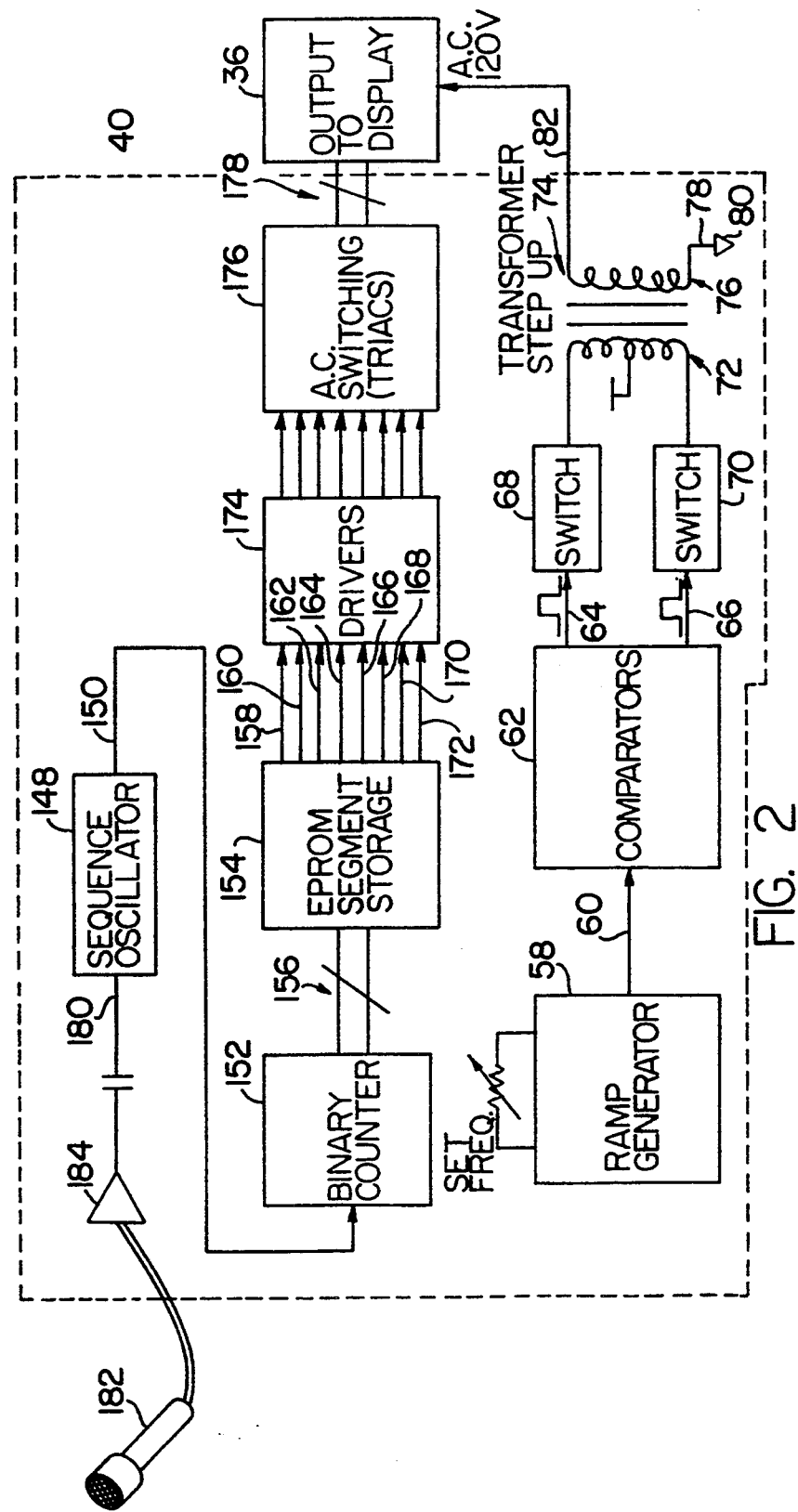

POWER SUPPLY FOR SEQUENTIALLY ENERGIZING SEGMENTS OF AN ELECTROLUMINESCENT PANEL TO PRODUCE ANIMATED DISPLAYS

BACKGROUND OF THE INVENTION

The present invention relates generally to animated graphic displays or signage and deals more particularly with a programmable power source for energizing segments of an electroluminescent (EL) display with a predetermined sequence to produce the graphic animation. Another aspect of the invention relates to the response to external stimuli such as sound or music to cause the program sequence to produce the animation in accordance with the rhythm or timing of the stimuli.

Lighting displays are generally well known and understood in the art and usually are made from a matrix of lighting elements arranged in rows and columns and as the lighting elements are actuated in a sequence, the text or graphic appears to have movement. Such matrix type display systems are relatively complex, provide poor graphics and particularly poor animated graphics. Typical travelling message and graphic display systems are illustrated in U.S. Pat. Nos. 3,651,511 and 4,162,493, respectively.

A further drawback generally associated with traveling displays of the above referenced type relate to the inability to produce an animated color changing graphic.

The above and other drawbacks generally associated with animated color graphic displays such as those simulated using neon lighting techniques and apparatus are overcome with the present invention wherein signage, either text or graphic or both is produced on a flexible electroluminescent sheet upon which an electroluminescent ink is silk screened in the desired graphic image to be presented wherein each segment of the EL display is energized in accordance with a programmed sequence stored in a memory device to produce the desired animated display.

SUMMARY OF THE INVENTION

A power supply for sequentially energizing segments of an EL device in accordance with a programmed sequence stored in a memory device is presented. The segments may make up portions of the desired graphic to be animated, signs, messages and so forth. Controllable switching means, for example TRIAC'S are coupled with an associated respective segment to provide electrical continuity between the segment electrode of the EL device and electrical ground. An alternate wave voltage is applied to the common electrode of the EL device whereby a voltage potential is developed between the common electrode and segment electrode when the switching device is conductive thereby causing that segment to become illuminated and extinguished when the switching device is non-conductive. An addressable memory device, for example, an electrically programmable read only memory (EPROM) contains binary coded information at addressable storage locations each of which stored information defines the segments of the display device to be illuminated when information is retrieved and outputted from the addressed location via an output coupled to a respective switching device. The speed at which information is sequentially retrieved from the EPROM may be at a predetermined rate or may be random in accordance with external audio signals such as music and so forth so that the animated graphic appears to move in synchronization with the music. One important feature of the present invention is that the same power supply may be used to power a number of different EL devices each having different graphic displays because the sequence information is contained in a memory device which may be substituted one for another without re-design of the power supply.

In another aspect of the invention, the alternate wave voltage waveform has an adjustable frequency and pulse width to match the characteristics of the EL device being powered to achieve the best possible brightness and EL device life. A triangular waveform generator configured as a schmitt trigger drives two comparators each of which produce a pulse train having a 180° phase relationship with respect to one another. The output of the comparators drive respective ends of a center tapped primary winding step up transformer to induce an alternate wave voltage potential across the secondary winding having a magnitude sufficient to excite the segments of the EL display device.

BRIEF DESCRIPTION OF THE DRAWINGS

FIG. 2 is a schematic functional block diagram showing the sequential power supply of the present invention.

DETAILED DESCRIPTION OF PREFERRED EMBODIMENTS

Figure 1:
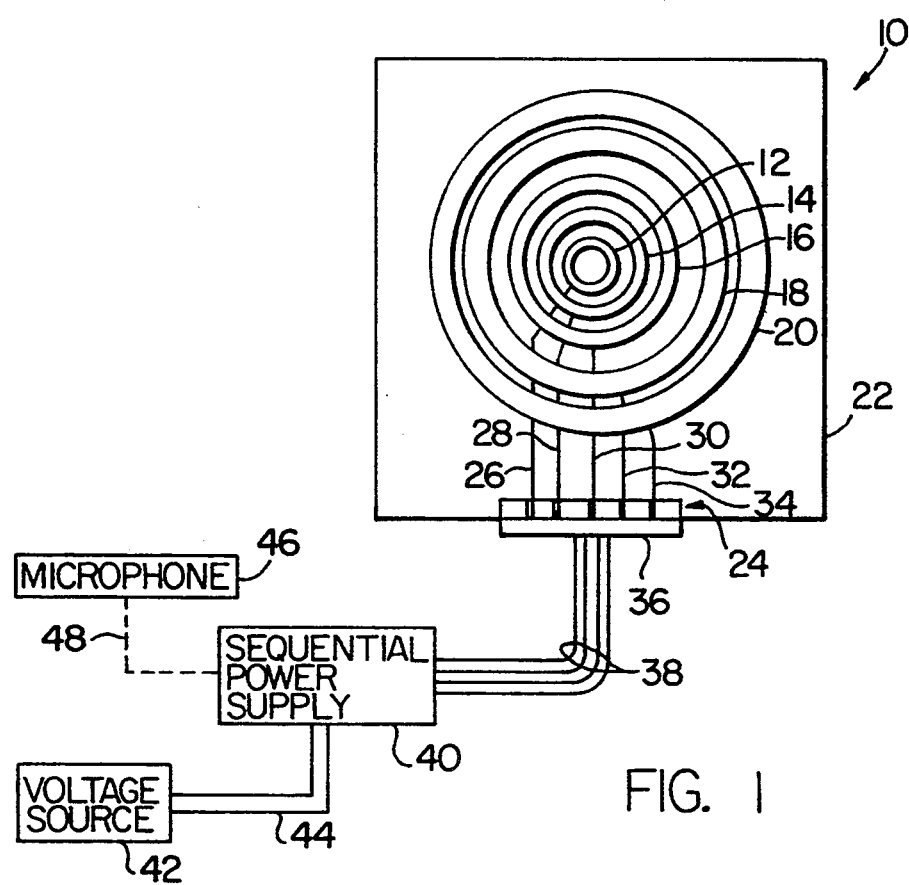
FIG. 1 is a schematic functional block diagram showing an EL device having a graphic to be animated coupled to the sequential power supply of the present invention.

Turning now to the drawings and considering the invention in further detail, FIG. 1 illustrates schematically an electroluminescent (EL) device and corresponding graphic with which the sequential power supply of the present invention may be practiced. In FIG. 1, the EL display device comprising the sign to be animated generally is designated 10 and comprises a number of concentric band circles 12, 14, 16 and 18 of increasing diameter and which are silk screened or printed on a flexible sheet 22 in accordance with techniques and construction well known to those skilled in the art. Each of the concentric band circles 12, 14, 16, 18 and 20 respectively form a "segment" of the sign and each is electrically coupled to a connector illustrated as an edge connector 24 by means of an electrical circuit path or conduit 26, 28, 30, 32 and 34, respectively. A complementary plug 36 mates with or receives the edge connector 24 and carries means for connecting respective associated conductors within the wire cable conduit 38 extending between the plug 36 and the sequential power supply embodying the present invention and illustrated generally within the functional block diagram 40. FIG. 1 also illustrates the sequential power supply 40 being coupled to a voltage source 42, typically an alternating current voltage source such as commercial power, via a power cord 44. FIG. 1 also illustrates an optional microphone represented by the functional block diagram 46 which is connected to the sequential power supply 40 as illustrated by the dash line 48. The operation of the sequential power supply 40 and the use of the optional microphone 46 is described in detail below.

Still considering the EL display sign 10 illustrated in FIG. 1, a description of a desired animated sequence is provided in order to gain a better understanding of the invention. Considering an animation sequence wherein it is desired to illuminate the segments in such a way as to provide the illusion of an ever expanding circle. In such an animation, the individual segments 12, 14, 16, 18 and 20 are energized and de-energized in sequence to provide the desired illusion. In this case, the segment 12 would be energized to provide an illuminated circle and would remain energized for a desired time. Segment 14 would then be energized and segment [12] would de-energized so that an illuminated circle larger than the illuminated circle provided by segment 12 would now be visible to a viewer. The sequence is progressively repeated with segment 16 now being energized and segment 14 being de-energized to provide a large illuminated circle. The sequence is repeated until such time as segment 20 is energized to provide the largest of the illuminated circles. It can be seen that by timing the sequence of energization and de-energization, a viewer will have the illusion of a repeating expanding circle. As will be evident in the detailed explanation of the sequential power supply 40, the sequence could be reversed such that a decreasing circle would be viewed by a viewer wherein the segment 20 is first energized for a time period with the energization sequence moving inward toward the smallest circle with a repeating energization/de-energization sequence. Since the sequential power supply 40 is programmable, as will be explained in further detail below, the energization of any the segments can be carried out in any desired sequence and for any desired time period to provide a different visual animated effects. For example, the segment 14 could be energized, then segment 20, then segment 12. The sequence of illumination and duration of illumination can be programmed as desired. For instance, all the segments could be energized and then de-energized one-by-one or in any order or grouping. Other examples will now become readily apparent to the reader.

The EL display sign 10 may also be configured to produce a changing color graphic by utilizing a different color electroluminescent ink or a screen printed color filter for each of the segments 12–20, respectively. Such color electroluminescent inks and filters are also known in the art.

An important feature of the sequential power supply embodying the present invention allows different graphic EL display signs to be energized and excited with different animation sequences using the same power supply since the animation sequence is controlled by means of a programmable memory element as is explained in further detail below. This feature allows the design of a single electronic circuit board which could be mass produced and therefore provide substantial cost savings and reduced expense in both production and in usage.

Figures 3, 3A:
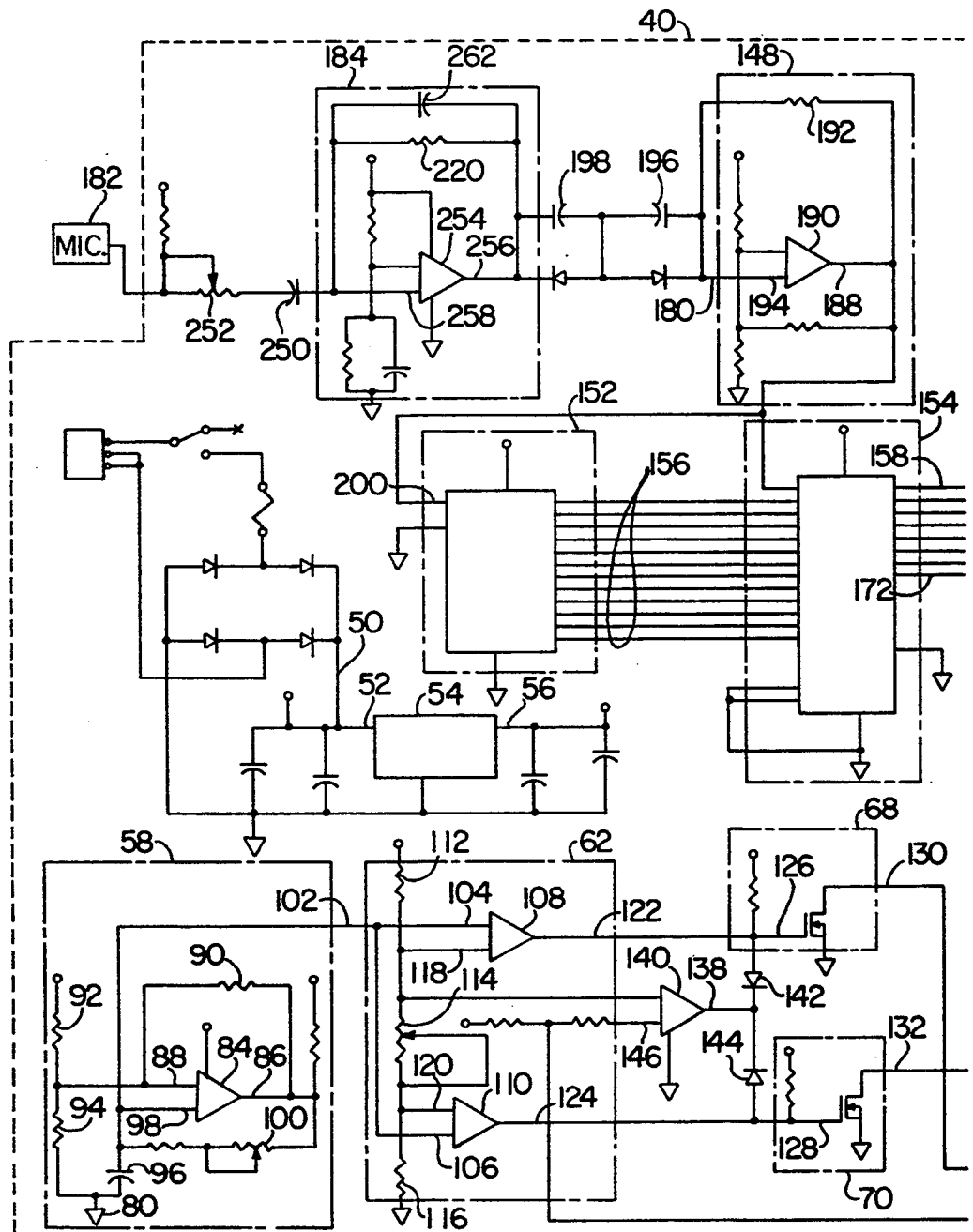
FIG. 3 consists of FIG. 3A and FIG. 3B which are partial views and when taken together is an electrical circuit schematic diagram showing one embodiment of the sequential power supply of the present invention.
Figure 3B:
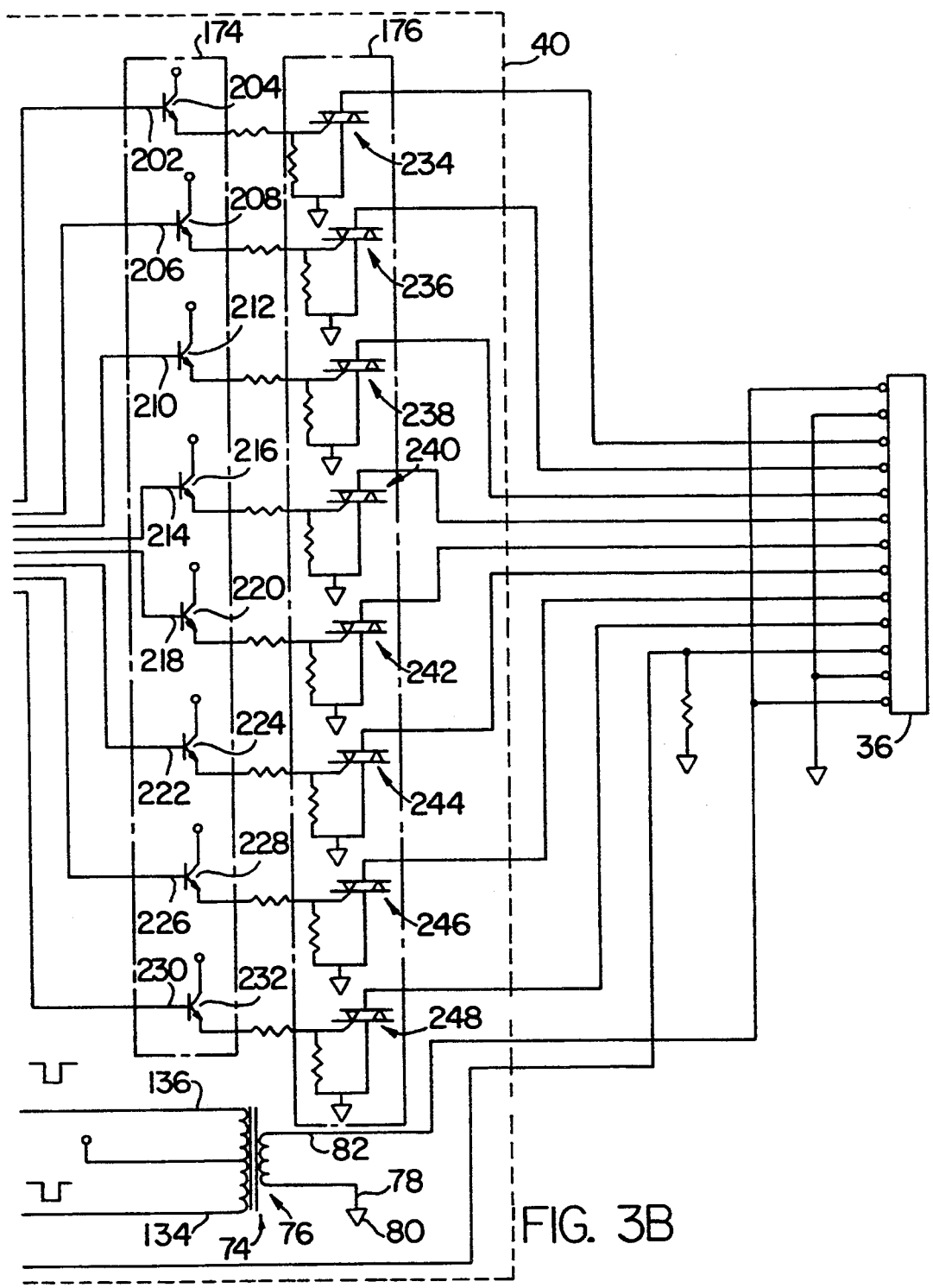

Turning now to FIGS. 2 and 3, a detailed description of the operation of the sequential power supply embodying the present invention follows. FIG. 2 illustrates in functional block diagram form, the major electrical functional circuit elements comprising the sequential power supply of the present invention. FIG. 3 shows one embodiment of an electrical circuit design for carrying out the implementation of the sequential power supply corresponding to the functional circuit blocks shown in FIG. 2 and correspond to the dashed line boxes of FIG. 3.

In the illustrated electronic circuit implementation, a positive 12 volt DC single supply rail voltage input is provided on lead 50 and to the input 52 of a linear voltage regulator 54 which in turn provides a +5 volt regulated voltage potential at its output 56. The +5 volt regulated voltage potential is used to power the various logic circuit elements comprising the sequential power supply. The 12 volt DC voltage input may be derived in any number of ways generally well known to those skilled in the art, for example, from a plug-in wall transformer for converting a conventional, commercial alternating current voltage potential to a 12 volt DC voltage potential; through utilization of a bridge rectifier to provide the 12 volt DC voltage potential; from a 12 volt DC voltage potential battery source, or from a solar panel having a capacity to produce a 12 volt DC voltage potential.

The characteristics of the EL display device contemplated for use with the present invention is for purposes of this disclosure operable from a 120 volt alternating current (VAC) voltage potential. It is known in the art that to achieve the best brightness and optimum life of an EL display device it is desirable to provide a voltage excitation source having a frequency and duration matched to the specific characteristics of the EL device to be illuminated. In the present invention, the excitation voltage potential generated to drive the EL display device utilizes a circuit with an adjustable drive frequency and pulse width modulation to adjust the duration of the excitation voltage potential to obtain the best possible illumination result. The excitation source includes a ramp generator 58 having an output 60 coupled to a comparator circuit 62 which in turn has outputs 64,66 each of which carry a pulse train. The output voltage pulse on output 64 has a 180 degree phase relationship with respect to the voltage pulse appearing on output 66. Each respective output 64,66 is coupled to an associated switching device 68,70, respectively. The outputs of the switching devices 68,70 are used to excite the primary winding 72 of a step-up transformer generally designated 74 to induce an excitation voltage potential having the desired magnitude across the secondary winding 76 wherein one end 78 of the secondary winding is coupled to electrical ground potential 80 and its opposite end 82 is coupled to a corresponding connection pin on a connector which receives and electrically couples the EL display device to the power supply.

As illustrated in further detail in FIG. 3, the ramp generator 58 comprises a schmitt trigger resistor-capacitor (RC) oscillator which includes an operational amplifier 84 having an output 86 coupled to a non-inverting input 88 via a feedback resistor 90. A series resistive voltage divider network comprising resistors 92,94 are connected between the 12 volt DC voltage supply and the ground reference potential 80, the junction of the resistive network being also coupled to the non-inverting input of the amplifier 84. A capacitor 96 is coupled between the inverting input 98 of the amplifier 84 and the ground potential 80. The output 86 of the amplifier is coupled to the non-inverting input 98 and the capacitor 96 through a variable resistance potentiometer 100. The trigger switch points for the schmitt trigger are set for $\frac{1}{3}$ and $\frac{2}{3}$, respectively of the supply voltage potential through selection of the values of resistors 90, 92 and 94. In addition, the feedback resistor 90 in conjunction with the capacitor 96 causes the ramp generator to produce a substantially symmetrical triangular ramp voltage waveform across the capacitor 96 as the capacitor charges and discharges from the output 86 of the amplifier 84. The triangular ramp voltage waveform is ½ the supply voltage potential peak-to-peak regardless of the frequency of operation and which frequency can be varied by adjusting the value of the variable potentiometer 100. The output 102 of the ramp generator 58 carries the triangular ramp voltage waveform and drives the inputs 104,106 of comparators 108 and 110, respectively. A resistive voltage divider network comprising resistors 112, 114 and 116 have values selected to set the DC voltage level at the second input 118 of comparator 108 and input 120 of comparator 110 at the desired DC voltage magnitude. The respective outputs 122 of the comparator 108 and 124 of the comparator 110 provide the pulse width modulated drive signals which are coupled to respective switching devices 68,70, respectively. The switching devices 68,70 are illustrated as metal oxide semiconductor field effect transistors (MOSFET) wherein the gate terminal 126 of the FET 68 is connected to the output 122 and the comparator 108 and the gate 128 of the FET 70 is connected to the output 124 of the comparator 110. The duration of the voltage pulses appearing at the outputs 130,132 of the FETs 68,70 respectively are set by adjustment of the resistive value of variable resistor 114. Accordingly, the pulse width of the voltage pulses appearing at the outputs 130,132 respectively can be adjusted over a very wide range by adjusting the value of the variable resistance 114 and in the illustrated embodiment, the pulse width is adjustable from 0 to 100% wherein at any setting of the variable resistance 114, the output voltage pulses have equal pulse widths and are phase shifted 180 degrees with respect to one another. The respective outputs 130,132 of the FETs 68,70 are connected to one end 134,136 respectively of the centertapped primary winding 72 of the transformer 74 to excite the primary winding and induce a stepped-up voltage magnitude across the secondary winding 76 to provide the necessary magnitude excitation voltage for the EL display device. The transformer 74 may typically be a ferrite core step-up transformer.

The switching devices 68,70 are inhibited when the EL display device is not present or plugged into the connector 36. The output 138 of the amplifier 140 is connected to the respective gates 126,128 of the FETs 68,70 through diodes 142,144 to clamp both switching devices 68,70 to inhibit the generation of an output voltage pulse. In the illustrated embodiment, a normally low voltage logic signal is coupled to the input 146 of the amplifier 140 so that the diodes 142,144 are back biased thus allowing the switching devices to operate. Upon removal of the low voltage logic signal indicating the absence of the EL display device, the input 146 is coupled to the +12 volt voltage supply 50 causing the output 138 of the inhibit amplifier 140 to switch to ground voltage reference potential thereby forward biasing the diodes 142,144 and clamping the respective gates 126,128 of the FETs 68,70 to ground reference potential. Ground potential at the gate forces the FET to an OFF condition and thus inhibits the generation of a pulse voltage signal at the respective outputs 130,132.

The speed or rate at which the various segments of the EL display device are illuminated is controlled by a sequence oscillator generally designated by the function block 148. The oscillator has an output 150 coupled to a binary counter generally designated 152. The output of the binary counter is coupled to an electrically programmable read-only-memory (EPROM) 154 via an address bus generally designated 156. The output of the binary counter generates the address count for the EPROM which is programmed with the segment pattern in accordance with the desired animation or movement to be produced by the EL display device. In the illustrated embodiment, eight segments are contemplated in the EL display device and therefore the EPROM has eight output leads 158–172. The output of the EPROM is used to activate segment drivers represented generally by the function block 174. The segment drivers are coupled to associated and respective segments of the EL display device to activate the segments at the appropriate times through switching devices illustrated generally by the function block 176. The outputs of the switching devices are coupled to the connector 36 which receives the EL display device via the eight lead bus 178.

The movement of the segments of the graphic of the EL display device may also be slaved and synchronized to external sounds such as music and other rhythms by coupling the input 180 of the sequence oscillator 148 to a microphone 182 which converts the audio sounds to electrical analog signals which are amplified by a preamplifier 184.

The sequence oscillator 148 comprises a resistor-capacitor (RC) oscillator which has a standard configuration wherein the output 188 of an operational amplifier 190 is fed back through feedback resistor 192 to the non-inverting input 194 of the amplifier. The oscillation frequency is determined by the time constant defined by the combination of the resistor 192 and the capacitors 196 and 198 and is in a configuration well known to those skilled in the art. The output 188 of the oscillator is a squarewave and is coupled to the clock input 200 of the binary counter 152. The output of the counter on the bus 156 serves as the address input to the EPROM 154. The outputs of the EPROM 154 on leads 158–172 are coupled to the base terminals of the segment drive transistors contained within the dashlined box 174 and each output 158,172, respectively carries an output voltage signal to enable the segment drivers at the proper times in accordance with the animation sequence of the graphic to be displayed by the EL display device. As illustrated, the output 158 of the EPROM 154 is coupled to the base 202 of the segment driver transistor 204. The remaining output leads 160–172 are coupled to the base terminals 206, 210, 214, 218, 222, 226, 30 respectively of the transistors 208, 212, 216, 220, 224, 28, 232. Each of the transistors 204–232 are coupled to a respective gate lead of a triac switching device 234–248 respectively. Each of the triacs 234–248 are coupled one-for-one to a respective connection on the connector 36 which is used to receive and electrically couple the EL display device to the apparatus and which connections provide a return ground reference for the AC excitation voltage applied to the back plane or common electrode of the EL display device when each of the respective segments is enabled in accordance with the pre-programmed sequence stored in the EPROM. The operation of triac switching devices is well known and understood to those skilled in the art and reference may be made to numerous text books and trade publications for additional information.

One feature of the present invention is that the sequence to activate the various segments comprising the EL display device is programmed in memory within the EPROM. Should the user desire to alter the display or change the sequence, a different EPROM may be programmed with the sequence information to replace the previous EPROM. It can be seen therefore that the present invention allows numerous EL graphic displays to be driven by a common apparatus since the sequence of the display is contained within the programmed memory of the EPROM.

External music or rhythms are coupled to the sequence oscillator through a microphone 182, preferably an electret microphone which converts the audio signals to electrical analog signals. The output of the microphone is coupled to the microphone preamplifier 184 through a coupling capacitor 250 and a variable series resistance 252 which is used to adjust the gain of the microphone preamplifier 184. The output of the coupling capacitor 250 is connected to the non-inverting input 258 of an operation amplifier 254. The output 256 of the amplifier 254 is AC coupled through resistor 260 and capacitor 262 into the ground reference at input 258 of the sequence oscillator to synchronize the sound display with any available music or background sound. The circuit arrangement insures that the animated graphic of the EL display device will synchronize with any background music or sounds but will automatically revert to free running oscillation if background music or sound is not present or if the microphone is disabled or removed.

A novel sequential power supply to produce an animated graphic in an EL display device has been described above in a preferred embodiment. It will be understood that numerous circuit modifications and component substitutions may be made without departing from the spirit and scope of the invention and therefore the invention has been presented by way of illustration rather than limitation.

I claim:

1. Apparatus for selectively powering or not powering respective segments of a selected one of a plurality of electroluminescent (EL) display devices, each of said EL display devices being of a different physical size and shape and each EL display device defining a different and distinct segment pattern characterizing a different and distinct graphic display, said graphic display including one or more numbers, letters, symbols, patterns, images, said apparatus comprising:

means for generating an alternate wave voltage having a predetermined magnitude to provide a first voltage potential to a common electrode of the EL display device, wherein said alternating wave generating means further comprises:

circuit means for generating a triangular waveform voltage;

first comparator circuit means having an input coupled to said triangular waveform voltage generating circuit for producing a first voltage pulse signal;

second comparator circuit means having an input coupled to said triangular waveform generating circuit for producing a second voltage pulse signal 180° out of phase with respect to said first voltage pulse signal;

voltage transformer circuit means having a primary winding and a secondary winding, said primary winding being centertapped and having one end driven by said first voltage pulse signal and an opposite end driven by said second voltage pulse signal to induce alternating wave voltage across said secondary winding, said transformer circuit means having a transformation ratio for stepping-up said voltage pulse signals driving said primary winding to a predetermined voltage magnitude across said secondary winding sufficient to excite said segments of said EL display device;

controllable electronic switching means having an electrically conductive ON switching condition and an electrically non-conductive OFF switching condition, said switching means coupled one-for-one to an associated respective segment of the EL display device for providing electrical continuity between the segment electrode of the EL display device and a second voltage reference potential to illuminate a said associated respective segment for a time duration corresponding to the time said switching means is electrically conductive;

at least one of a number of addressable memory means for storing at least one addressable location for identification and subsequent retrieval binary coded data information defining the segments to be energized in the selected one of the plurality of different and distinct EL display devices, said at least one addressable memory means having output means coupled to said controllable electronic switching means for selectively operating said switching means to its respective ON switching condition and OFF switching condition;

addressing means coupled to said at least one of said number of addressable memory means for sequentially accessing said at least one addressable location to retrieve the binary coded data information stored therein;

timing means coupled to said at least one of said number of addressing means for producing timing pulses in a predetermined timed relationship with respect to one another and in a random timed relationship with respect to one another whereby said segments of the selected EL display device are energized in accordance with the binary coded data information stored in said selected at least one addressable memory means and retrieved from said addressable memory locations in said selected one of said addressable memory means in accordance with a selected one of a possible number of programmed sequences defining the respective segments of the selected EL display device to selectively power the segments to produce the desired animated graphic display.

2. Apparatus for selectively powering or not powering respective segments of a selected one of a plurality of electroluminescent (EL) display devices as defined in claim 1 wherein said at least one of a number of addressable memory means further comprises a non-computerized first programmable semiconductor memory device whereby a different desired animated display graphic is produced by substituting said first programmable semiconductor device with a second programmable semiconductor device having binary coded data information different and distinct from said first programmable semiconductor device.

3. Apparatus for selectively powering or not powering respective segments of a selected one of a plurality of electroluminescent (EL) display devices as set forth in claim 2 wherein said non-computerized programmable semiconductor memory device comprises an electronically programmable read only memory (EPROM) device.

4. Apparatus for selectively powering or not powering respective segments of a selected one of a plurality of electroluminescent (EL) display devices as set forth in claim 1 wherein said addressing means further comprises a binary counter.

5. Apparatus for selectively powering or not powering respective segments of a selected one of a plurality of electroluminescent (EL) display devices as set forth in claim 1 wherein said timing means comprises a square wave oscillator whereby said animated graphic display changes in accordance with the frequency of the oscillator.

6. Apparatus for selectively powering or not powering respective segments of a selected one of a plurality of electroluminescent (EL) display devices as set forth in claim 5 further comprising:
    transducer means for sensing and converting audio signals to electrical analog signals;
    means for coupling said converted electrical analog signals to said square wave oscillator for operatively changing the frequency of oscillator of said square wave oscillator to follow the frequency of the sensed audio signals present whereby said animated graphic display changes in accordance with the frequency of the audio signals present.

7. Apparatus for selectively powering or not powering respective segments of a selected one of a plurality of electroluminescent (EL) display devices as defined in claim 1 further comprising adjustable resistive circuit means coupled to the inputs of said first and second comparators for varying the width of said first and second voltage pulse signals over a range between zero percent and one hundred percent.

8. Apparatus for selectively powering or not powering respective segments of a selected one of a plurality of electroluminescent (EL) display devices as defined in claim 1 further comprising circuit means coupled to the output of said first and second comparators and the EL display device for inhibiting the production of said first and second voltage pulse signals, and
    means for sensing the presence or absence of the EL display device coupled to said apparatus, said first and second voltage pulse signals being inhibited in response to the sensing of the absence of the EL display device.

9. Apparatus for selectively powering or not powering respective segments of a selected one of a plurality of electroluminescent (EL) display devices as defined in claim 1 further comprising said first comparator circuit means being coupled to said one end of said primary winding by means of a first field effect transistor semiconductor device and said second comparator circuit means being coupled to said opposite end of said primary winding by means of a second field effect transistor semiconductor device.

10. Apparatus for sequentially powering segments of an electroluminescent (EL) display device to produce an animated graphic display, said device comprising:
    means for generating an alternate wave voltage having a predetermined magnitude to provide a first voltage potential to a common electrode of the EL device;
    controllable electronic switching means coupled to an associated respective segment of the EL device for providing electrical continuity between the segment electrode of the EL device and a second voltage reference potential to cause said segment to be illuminated when said switching means is electrically conductive;
    addressable memory means coupled to said controllable electronic switching means for storing at at least one addressable location binary coded data information defining the segments to be energized;
    addressing means coupled to said addressable memory means for accessing said at least one addressable location to retrieve the binary coded information stored therein;
    timing means coupled to said addressing means for producing timing pulses in a predetermined timed relationship with respect to one another and in a random timed relationship with respect to one another whereby said segments of the EL display are energized with the binary coded data information retrieved from said addressable memory locations in accordance with a programmed sequence to produce the desired animated graphic display;
    wherein said alternating wave generating means further comprises:
    circuit means for generating a triangular waveform voltage;
    first comparator circuit means having an input coupled to said triangular waveform voltage generating circuit for producing a first voltage pulse signal;
    second comparator circuit means having an input coupled to said triangular waveform generating circuit for producing a second voltage pulse signal 180° out of phase with respect to said first voltage pulse signal;
    voltage transformer circuit means having a primary winding and a secondary winding, said primary winding being centertapped and having one end driven by said first voltage pulse signal and an opposite end driven by said second voltage pulse signal to induce alternating wave voltage across said secondary winding, said transformer circuit means having a transformation ratio for stepping-up said voltage pulse signals driving said primary winding to a predetermined voltage magnitude across said secondary winding sufficient to excite said segments of said EL display device.

* * * * *